US007291775B2

(12) United States Patent
Yu

(10) Patent No.: US 7,291,775 B2
(45) Date of Patent: Nov. 6, 2007

(54) MULTIFUNCTIONAL MUSICAL INSTRUMENT STAND

(76) Inventor: Ming-Ti Yu, 122-5, Jun Liao Rd., Feng Yuan, Taichung Hsien (TW)

( * ) Notice: Subject to any disclaimer, the term of this patent is extended or adjusted under 35 U.S.C. 154(b) by 372 days.

(21) Appl. No.: 11/111,259

(22) Filed: Apr. 22, 2005

(65) Prior Publication Data

US 2006/0236842 A1 Oct. 26, 2006

(51) Int. Cl.
*G10D 3/00* (2006.01)
*G10D 13/02* (2006.01)
*F16M 11/38* (2006.01)

(52) U.S. Cl. .......................... 84/327; 84/421; 248/166; 248/434; 248/443

(58) Field of Classification Search ................. D6/419, D6/511; 84/327, 190, 379, 403, 421, 422.3; 248/158, 165, 166, 170, 171, 441.1, 445, 248/460
See application file for complete search history.

(56) References Cited

U.S. PATENT DOCUMENTS 1,045,583 A * 11/1912 Mills ......................... 211/85.6
2,232,151 A * 2/1941 Trew ......................... 84/385 R
3,893,363 A * 7/1975 Cohen ......................... 84/402
3,958,786 A * 5/1976 Mann ....................... 248/176.3
4,099,441 A * 7/1978 Landon ........................ 84/327
4,352,480 A * 10/1982 Gathright ..................... 248/448
4,987,817 A * 1/1991 Diaz ........................... 84/421
5,267,500 A * 12/1993 Lombardi ..................... 84/402
5,375,497 A * 12/1994 Pirchio et al. ................ 84/327
5,454,473 A * 10/1995 Hennessey ................. 211/85.6
5,467,680 A * 11/1995 Kurosaki ..................... 84/421
5,664,756 A * 9/1997 Liao ........................... 248/443
5,713,547 A * 2/1998 Yu ............................. 248/166
5,726,369 A * 3/1998 Gilday ........................ 84/327
5,744,735 A * 4/1998 Liao ............................ 84/327
5,836,552 A * 11/1998 Yu ............................. 248/166
5,957,417 A * 9/1999 Yu ............................. 248/166
5,959,225 A * 9/1999 Hsu ............................ 84/327
5,986,197 A * 11/1999 Allen ...................... 84/411 M
6,005,176 A * 12/1999 Yu .............................. 84/327
6,036,159 A * 3/2000 Yu ............................. 248/443
6,091,008 A * 7/2000 Yu .............................. 84/327
6,091,011 A * 7/2000 Simons et al. ................ 84/421
6,113,040 A * 9/2000 Yu ............................. 248/166
6,121,527 A * 9/2000 Hamm ........................ 84/327
6,127,612 A * 10/2000 Yu .............................. 84/327
6,204,440 B1 * 3/2001 Yu .............................. 84/327
6,209,829 B1 * 4/2001 Yu .......................... 248/122.1
6,283,421 B1 * 9/2001 Eason et al. ................ 248/170
6,316,706 B1 * 11/2001 Sammons .................... 84/327

(Continued)

*Primary Examiner*—Lincoln Donovan
*Assistant Examiner*—Christina Russell
(74) *Attorney, Agent, or Firm*—Alan Kamrath; Kamrath & Associates PA

(57) ABSTRACT

A musical instrument stand includes a base, a rod mounted on the base, a first mounting seat mounted on the rod, a second mounting seat mounted on the rod and located between the base and the first mounting seat, a plurality of first support members each detachably mounted on the first mounting seat, and a plurality of second support members each detachably mounted on the second mounting seat. Thus, the musical instrument stand has a plurality of first support members and a plurality of second support members for supporting a plurality of musical instruments without having to provide multiple musical instrument stands to support different musical instruments, thereby decreasing the purchase costs, and thereby saving the space of storage.

19 Claims, 7 Drawing Sheets

U.S. PATENT DOCUMENTS

| | | | | | |
|---|---|---|---|---|---|
| 6,323,405 | B1 | * | 11/2001 | Yu | 84/327 |
| 6,412,742 | B1 | * | 7/2002 | Yu | 248/434 |
| 6,439,532 | B1 | * | 8/2002 | Yu | 248/443 |
| 6,464,189 | B1 | * | 10/2002 | Yu | 248/323 |
| 6,481,677 | B1 | * | 11/2002 | Yu | 248/220.41 |
| 6,484,977 | B1 | * | 11/2002 | Yu | 248/125.1 |
| 6,513,768 | B1 | * | 2/2003 | Hsieh | 248/121 |
| 6,533,228 | B1 | * | 3/2003 | Yu | 248/166 |
| 6,536,720 | B1 | * | 3/2003 | Yu | 248/125.7 |
| 6,585,199 | B1 | * | 7/2003 | Yu | 248/166 |
| 6,685,145 | B2 | * | 2/2004 | Mackay et al. | 248/125.1 |
| 6,722,617 | B2 | * | 4/2004 | Wilfer | 248/163.1 |
| 6,881,884 | B2 | * | 4/2005 | Hsieh | 84/327 |
| 6,982,373 | B1 | * | 1/2006 | Yu | 84/327 |
| 7,105,732 | B1 | * | 9/2006 | Hsieh | 84/327 |
| 7,151,213 | B2 | * | 12/2006 | Hsieh | 84/453 |
| D538,554 | S | * | 3/2007 | Tai | D6/466 |
| 2002/0070319 | A1 | * | 6/2002 | Yu | 248/122.1 |
| 2002/0088914 | A1 | * | 7/2002 | Yu | 248/434 |
| 2003/0052237 | A1 | * | 3/2003 | Yu | 248/125.8 |
| 2003/0173473 | A1 | * | 9/2003 | Mackay et al. | 248/125.7 |
| 2003/0173484 | A1 | * | 9/2003 | Hsieh | 248/291.1 |
| 2004/0016856 | A1 | * | 1/2004 | Wilfer | 248/163.1 |
| 2004/0144233 | A1 | * | 7/2004 | Hsieh | 84/327 |
| 2004/0237755 | A1 | * | 12/2004 | Laio | 84/327 |
| 2005/0011337 | A1 | * | 1/2005 | Hsieh | 84/327 |
| 2005/0016354 | A1 | * | 1/2005 | Kent | 84/327 |
| 2005/0035255 | A1 | * | 2/2005 | Walker | 248/312 |
| 2005/0274854 | A1 | * | 12/2005 | May | 248/171 |
| 2006/0016952 | A1 | * | 1/2006 | Workman | 248/443 |
| 2006/0042451 | A1 | * | 3/2006 | Marnell | 84/422.3 |
| 2006/0162529 | A1 | * | 7/2006 | Hsieh | 84/327 |
| 2006/0201309 | A1 | * | 9/2006 | Hsieh | 84/329 |
| 2006/0213351 | A1 | * | 9/2006 | Hsieh | 84/327 |

* cited by examiner

MULTIFUNCTIONAL MUSICAL INSTRUMENT STAND

BACKGROUND OF THE INVENTION

1. Field of the Invention

The present invention relates to a musical instrument stand, and more particularly to a multifunctional musical instrument stand.

2. Description of the Related Art

A conventional musical instrument stand 1 in accordance with the prior art shown in FIG. 1 comprises a base 11 having three legs 111 and two support bars 112 a rod 13 mounted on and extended upward from the base 11, a first support member 12 mounted on the rod 13 and including a T-shaped support bracket 121 and two pads 122 mounted on two ends of the support bracket 121, and a second support member 14 mounted on the rod 13 and including a substantially U-shaped support bar 141 mounted on the top of the rod 13 and a protective bar 142 having a first end pivotally mounted on a first end of the support bar 141 and a second end snapped onto a second end of the support bar 141 so that the protective bar 142 and the support bar 141 form a closure space. Thus, when a musical instrument such as a guitar 15 is placed on the musical instrument stand 1, the body 151 of the guitar 15 is supported by the two support bars 112 and the two pads 122, and the neck 152 of the guitar 15 is supported by the support bar 141 and locked by the protective bar 142 closely. However, the conventional musical instrument stand is only used for placing a single musical instrument, so that the user needs to provide a plurality of musical instrument stands for placing multiple musical instruments, thereby increasing costs of the musical instrument stands. In addition, the multiple musical instrument stands occupy larger space, thereby causing inconvenience to the user in transportation and storage of the multiple musical instrument stands.

The closest prior art references of the conventional musical instrument stand were disclosed in the applicant's U.S. Pat. Nos. 6,585,199 and 6,772,981.

SUMMARY OF THE INVENTION

In accordance with the present invention, there is provided a musical instrument stand, comprising a base, a rod mounted on and extended upward from the base, a first mounting seat mounted on the rod, a second mounting seat mounted on the rod and located between the base and the first mounting seat, a plurality of first support members each detachably mounted on the first mounting seat, and a plurality of second support members each detachably mounted on the second mounting seat.

The primary objective of the present invention is to provide a multifunctional musical instrument stand that utilizes the space efficiently.

Another objective of the present invention is to provide a musical instrument stand, wherein the musical instrument has an upper portion hung on the respective first support member and a lower portion supported by the respective second support member, so that the musical instrument is supported rigidly and stably without oscillation.

A further objective of the present invention is to provide a musical instrument stand, wherein the musical instrument stand comprises a plurality of first support members and a plurality of second support members for supporting a plurality of musical instruments without having to provide multiple musical instrument stands to support different musical instruments, thereby decreasing the purchase costs, and thereby saving the space of storage.

A further objective of the present invention is to provide a musical instrument stand, wherein the second support members have multiple kinds of forms so as to support the musical instruments in different manners, thereby enhancing the outer appearance of the musical instruments, and thereby saving space of exhibition.

Further benefits and advantages of the present invention will become apparent after a careful reading of the detailed description with appropriate reference to the accompanying drawings.

DETAILED DESCRIPTION OF THE INVENTION

Figure 1:
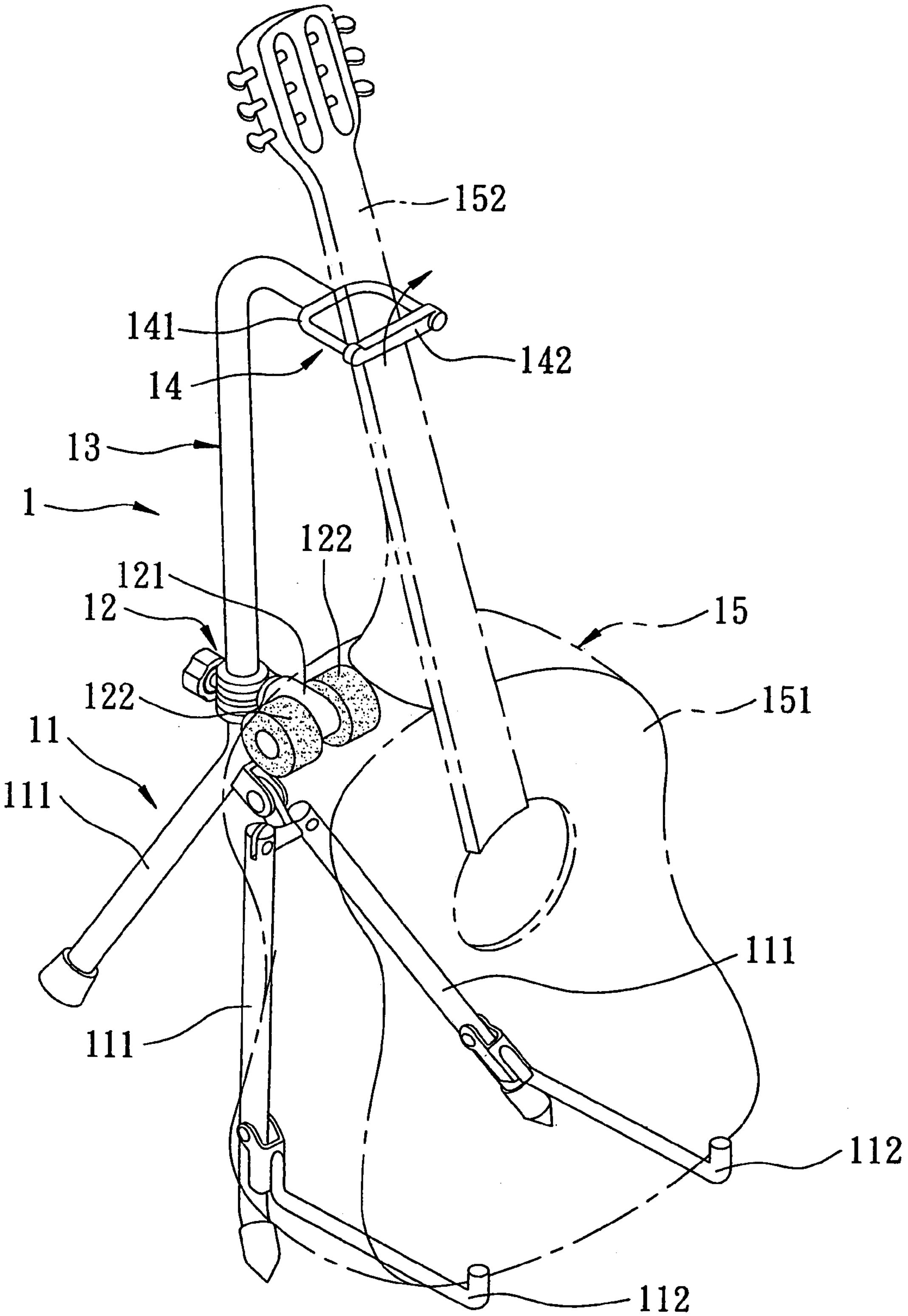
F I G. 1 PRIOR ART
FIG. 1 is a perspective view of a conventional musical instrument stand in accordance with the prior art.
Figure 2:
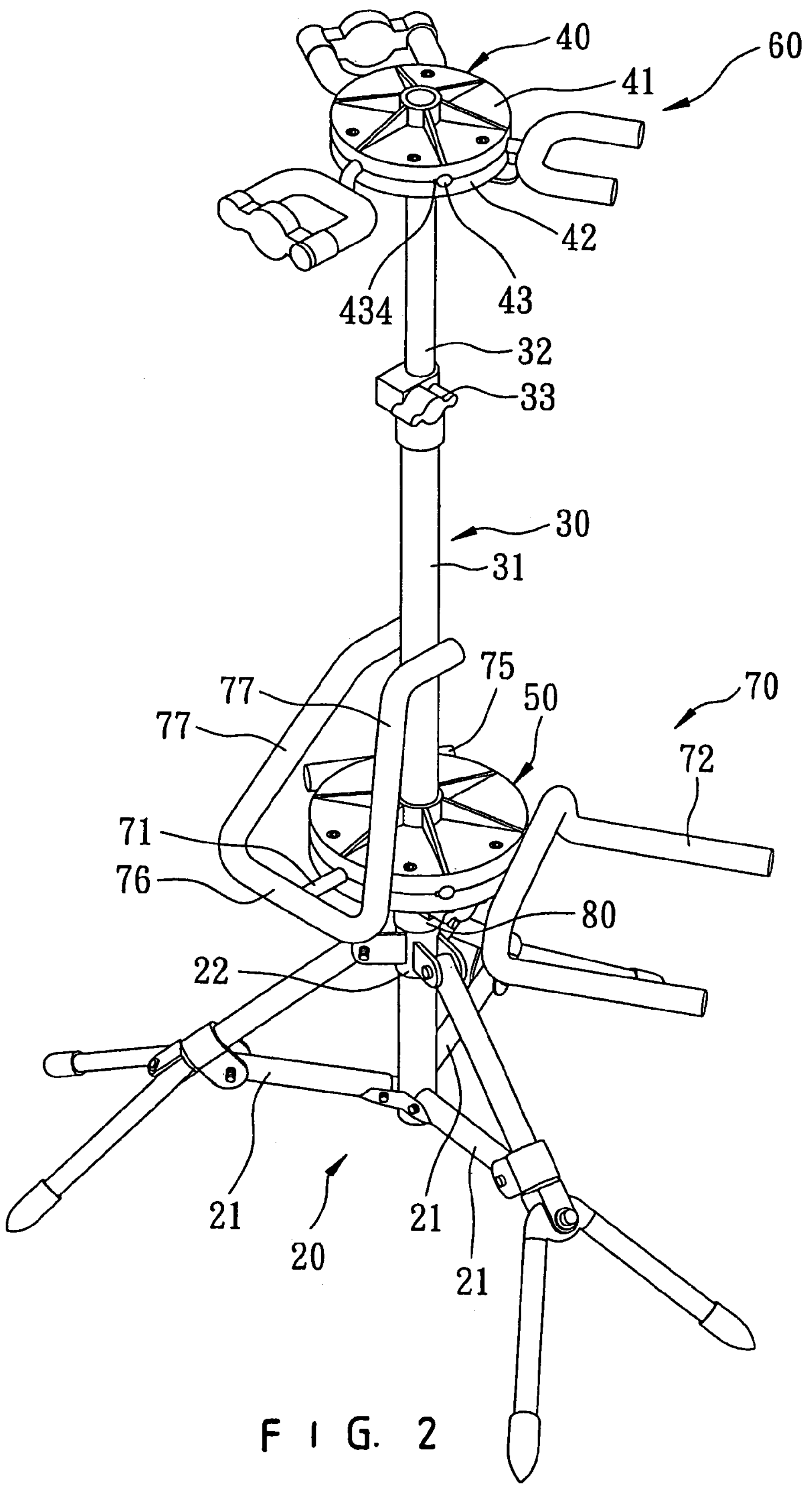
FIG. 2 is a perspective view of a musical instrument stand in accordance with the preferred embodiment of the present invention.
Figure 3:
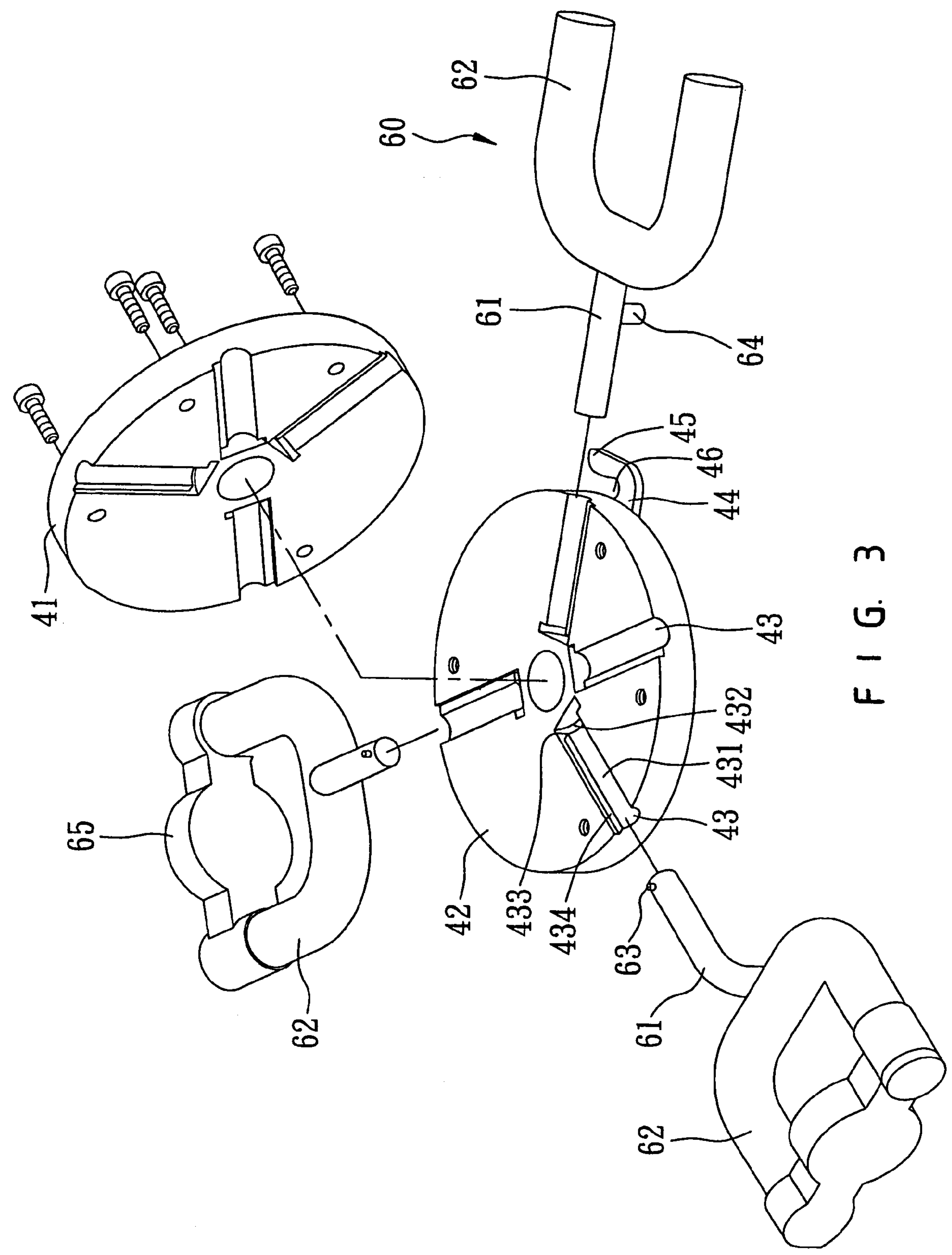
FIG. 3 is a partially exploded perspective view of the musical instrument stand as shown in FIG. 2.
Figure 4:
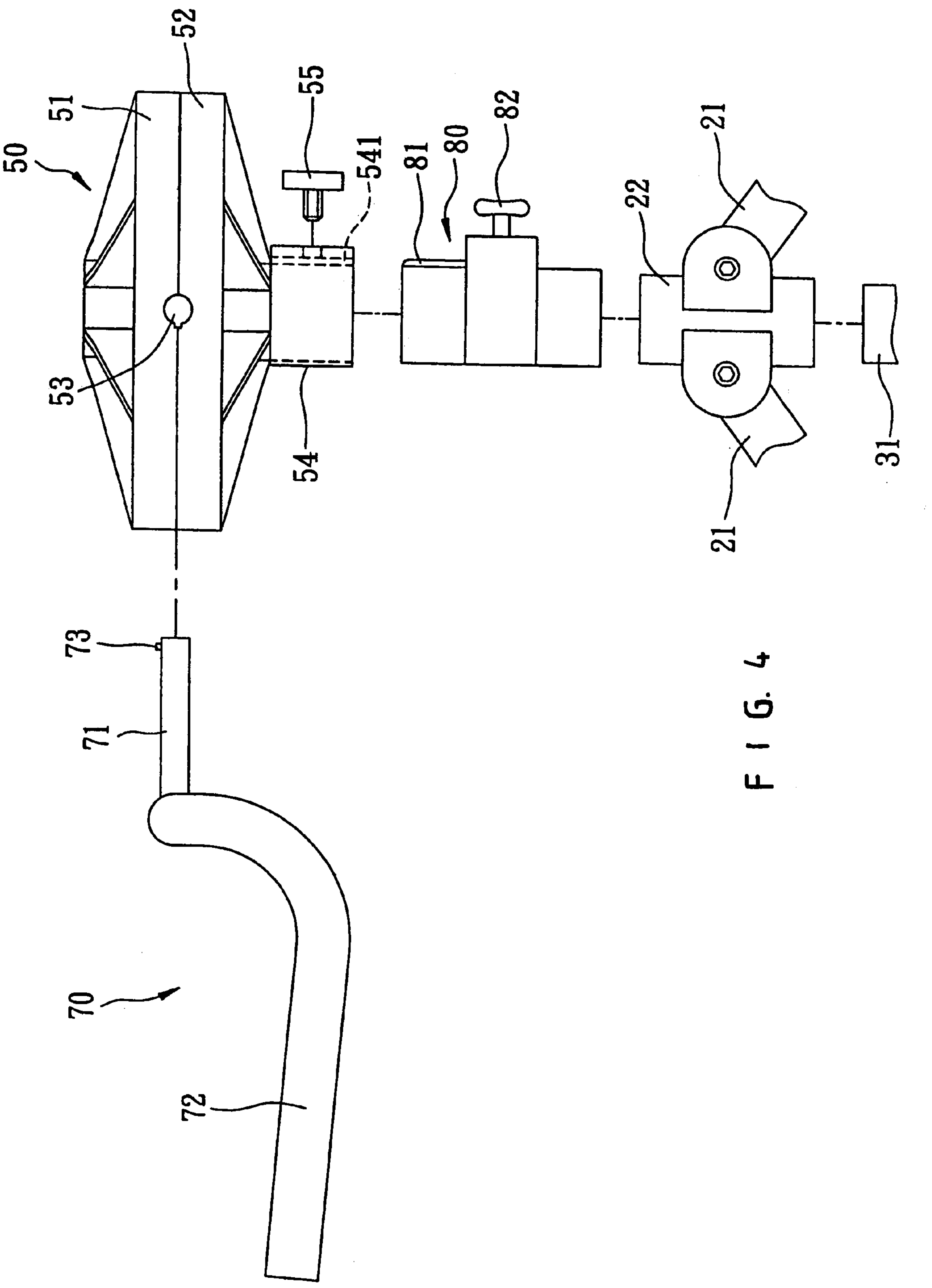
FIG. 4 is a partially plan exploded view of the musical instrument stand as shown in FIG. 2.

Referring to the drawings and initially to FIGS. 2-4, a musical instrument stand in accordance with the preferred embodiment of the present invention comprises a base 20, a rod 30 mounted on and extended upward from the base 20, a first mounting seat 40 mounted on the rod 30, a second mounting seat 50 mounted on the rod 30 and located between the base 20 and the first mounting seat 40, a plurality of first support members 60 each detachably mounted on the first mounting seat 40, a plurality of second support members 70 each detachably mounted on the second mounting seat 50, and a connecting sleeve 80 mounted on the rod 30 and located between the base 20 and the second mounting seat 50.

The base 20 includes a fixing sleeve 22 mounted on the rod 30, and three support legs 21 each mounted between the fixing sleeve 22 and the rod 30 and each expanded outward from the rod 30.

The connecting sleeve 80 includes a positioning block 81 mounted on the rod 30 and having a first end mounted on the fixing sleeve 22 of the base 20 and a second end inserted into the second mounting seat 50, and a pressing member 82 extended through the positioning block 81 and pressed on the fixing sleeve 22 of the base 20 so that the connecting sleeve 80 is fixed on the base 20.

The rod 30 includes a fixed post 31 combined with the base 20, a movable post 32 movably mounted on and extended upward from the fixed post 31, and an adjusting mechanism 33 mounted between the fixed post 31 and the movable post 32.

The first mounting seat 40 is mounted on a top of the movable post 32 of the rod 30 and includes a first upper disk 41, a first lower disk 42 combined with the first upper disk 41, a plurality of first mounting holes 43 each formed between the first upper disk 41 and the first lower disk 42 and each extended along a peripheral face of the first upper disk 41 and the first lower disk 42, and an extension bar 44 extended from the first upper disk 41 and the first lower disk 42. The extension bar 44 is mounted on and extended from the first lower disk 42 and is located adjacent to either one of the first mounting holes 43. The extension bar 44 is substantially L-shaped. The extension bar 44 has a distal end formed with a bent clamping portion 45 and has an inside formed with a locking hole 46 located between the clamping portion 45 and the first lower disk 42.

Each of the first mounting holes 43 of the first mounting seat 40 has an outer portion formed with a first bore 431 extended through the peripheral face of the first upper disk 41 and the first lower disk 42 and an inner portion formed with a second bore 432 having a diameter greater than that of the first bore 431. Each of the first mounting holes 43 of the first mounting seat 40 is formed with a resting shoulder 433 located between the first bore 431 and the second bore 432. Each of the first mounting holes 43 of the first mounting seat 40 has a side formed with a limit channel 434 connected to the first bore 431 and the second bore 432.

Each of the first support members 60 is detachably mounted on a respective one of the first mounting holes 43 of the first mounting seat 40.

In the first preferred embodiment of the present invention, each of the first support members 60 includes a first mounting rod 61 mounted in the respective first mounting hole 43 of the first mounting seat 40, a substantially U-shaped support bar 62 mounted on a first end of the first mounting rod 61 and protruding outward from the respective first mounting hole 43 of the first mounting seat 40, a first limit stub 63 mounted on a second end of the first mounting rod 61 and extended through the limit channel 434 into the second bore 432 of the respective first mounting hole 43, and a protective bar 65 having a first end pivotally mounted on a first end of the support bar 62 and a second end snapped onto a second end of the support bar 62 so that the protective bar 65 and the support bar 62 form a closure space. The first limit stub 63 of each of the first support members 60 is rested on the resting shoulder 433 of the respective first mounting hole 43 so that each of the first support members 60 is secured to the first mounting seat 40 rigidly and stably.

In the second preferred embodiment of the present invention, each of the first support members 60 includes a first mounting rod 61 mounted in the respective first mounting hole 43 of the first mounting seat 40, a substantially U-shaped support bar 62 mounted on a distal end of the first mounting rod 61 and protruding outward from the respective first mounting hole 43 of the first mounting seat 40, and a locking stub 64 mounted on the first mounting rod 61 and detachably locked in the locking hole 46 of the extension bar 44. The locking stub 64 of each of the first support members 60 is located adjacent to the support bar 62 and is clamped by the clamping portion 45 of the extension bar 44. The locking hole 46 of the extension bar 44 has an opened end having a width slightly smaller than a diameter of the locking stub 64 of each of the first support members 60 and a closed end having a width slightly greater than the diameter of the locking stub 64 of each of the first support members 60 so that the locking stub 64 of each of the first support members 60 is locked in the locking hole 46 of the extension bar 44 closely.

The second mounting seat 50 has a structure similar to that of the first mounting seat 40 and includes a second upper disk 51, a second lower disk 52 combined with the second upper disk 51, a plurality of second mounting holes 53 each formed between the second upper disk 51 and the second lower disk 52 and each extended along a peripheral face of the second upper disk 51 and the second lower disk 52.

Each of the second mounting holes 53 of the second mounting seat 50 has an outer portion formed with a first bore extended through the peripheral face of the second upper disk 51 and the second lower disk 52 and an inner portion formed with a second bore having a diameter greater than that of the first bore. Each of the second mounting holes 53 of the second mounting seat 50 is formed with a resting shoulder located between the first bore and the second bore. Each of the second mounting holes 53 of the second mounting seat 50 has a side formed with a limit channel connected to the first bore and the second bore.

The difference between the second mounting seat 50 and the first mounting seat 40 is in that the second mounting seat 50 further includes an outer sleeve 54 extended from the second lower disk 52 and mounted on the positioning block 81 of the connecting sleeve 80, and a positioning member 55 extended through the outer sleeve 54 and pressed on the positioning block 81 of the connecting sleeve 80 so that the second mounting seat 50 is fixed on the connecting sleeve 80. The outer sleeve 54 of the second mounting seat 50 has an inside formed with a positioning recess 541 mounted on the positioning block 81 of the connecting sleeve 80.

Each of the second support members 70 is detachably mounted on a respective one of the second mounting holes 53 of the second mounting seat 50 and is corresponding to a respective one of the first support members 60.

In the third preferred embodiment of the present invention, each of the second support members 70 includes a second mounting rod 71 mounted in the respective second mounting hole 53 of the second mounting seat 50, a substantially U-shaped support bar 72 mounted on a first end of the second mounting rod 71 and protruding outward from the respective second mounting hole 53 of the second mounting seat 50, and a second limit stub 73 mounted on a second end of the second mounting rod 71 and extended through the limit channel into the second bore of the respective second mounting hole 53. The second limit stub 73 of each of the second support members 70 is rested on the resting shoulder of the respective second mounting hole 53 so that each of the second support members 70 is secured to the second mounting seat 50 rigidly and stably.

Figure 5:
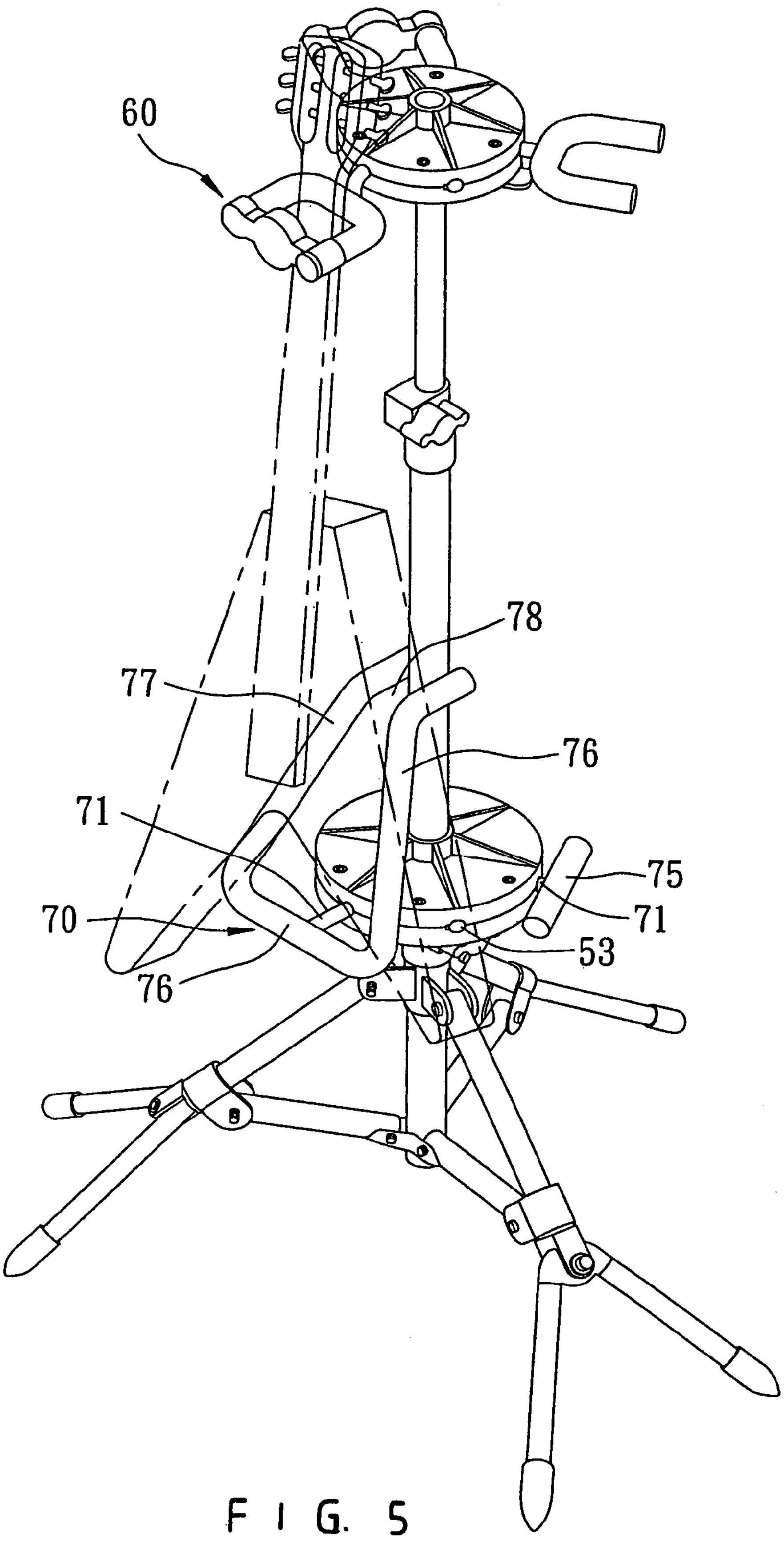
FIG. 5 is a schematic operational view of the musical instrument stand as shown in FIG. 2 in use.

As shown in FIG. 5, in the fourth preferred embodiment of the present invention, each of the second support members 70 includes a second mounting rod 71 mounted in the respective second mounting hole 53 of the second mounting seat 50, a substantially T-shaped support bar 75 mounted on a distal end of the second mounting rod 71 and protruding outward from the respective second mounting hole 53 of the second mounting seat 50 for supporting the back of a musical instrument. Thus, when the musical instrument is hung on the respective first support member 60, the support bar 75 of the respective second support member 70 is rested on the back of the musical instrument, so that the musical instrument is supported rigidly and stably without oscillation.

In the fifth preferred embodiment of the present invention, each of the second support members 70 includes a second mounting rod 71 mounted in the respective second mounting hole 53 of the second mounting seat 50, a transverse bar 76 mounted on a distal end of the second mounting rod 71 and protruding outward from the respective second mounting hole 53 of the second mounting seat 50, and two side bars 77 each having an oblique first end extended upward from the transverse bar 76 and a bent second end rested on the rod 30. The second ends of the two side bars 77 of each of the second support members 70 form a clamping opening 78 (see FIG. 5) for clamping the rod 30.

Figure 6:
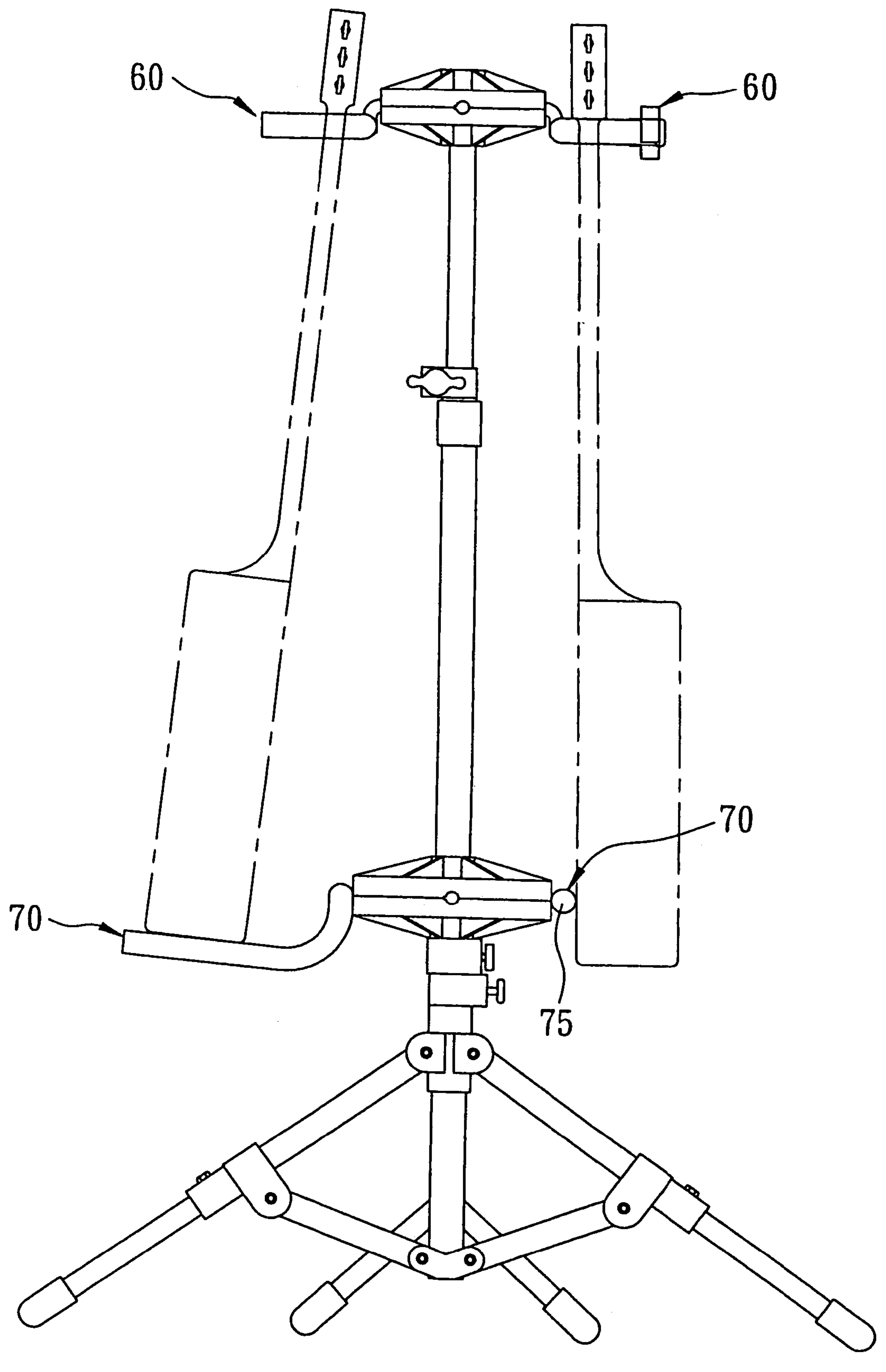
FIG. 6 is a schematic plan operational view of the musical instrument stand as shown in FIG. 2 in use.

In practice, referring to FIGS. 2, 5 and 6, the musical instrument has an upper portion hung on the respective first support member 60 and a lower portion supported by the respective second support member 70, so that the musical instrument is supported rigidly and stably without oscillation. In addition, the musical instrument stand comprises a plurality of first support members 60 and a plurality of second support members 70 for supporting a plurality of musical instruments, thereby saving space of storage. In addition, the second support members 70 have three kinds of forms so as to support the musical instruments in different manners as shown in FIGS. 5 and 6, thereby enhancing the outer appearance of the musical instruments, and thereby saving space of storage.

Figure 7:
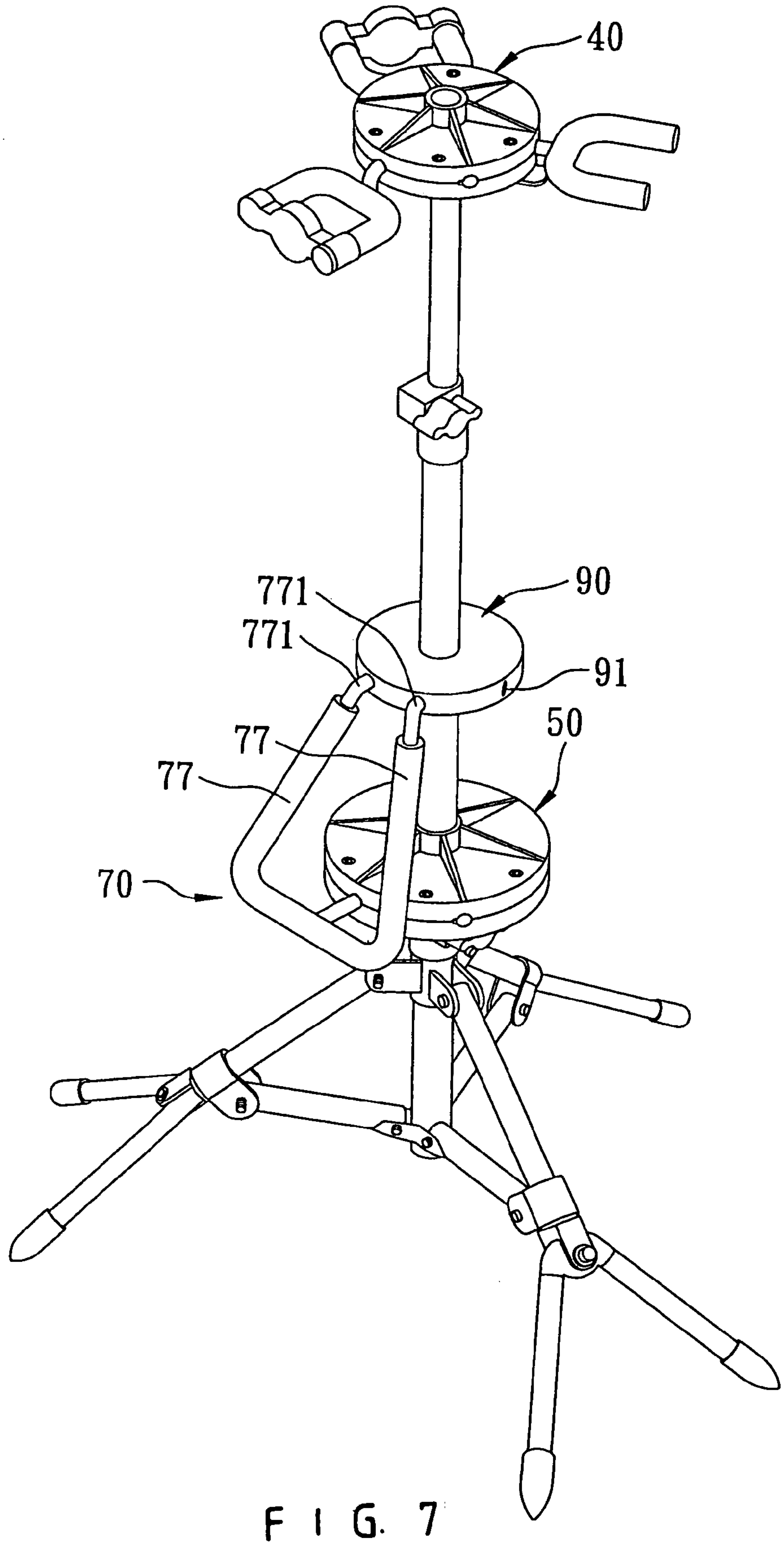
FIG. 7 is a perspective view of a musical instrument stand in accordance with another preferred embodiment of the present invention.

Referring to FIG. 7, a musical instrument stand in accordance with another preferred embodiment of the present invention further comprises a third mounting seat 90 mounted on the rod 30 and located between the first mounting seat 40 and the second mounting seat 50. The third mounting seat 90 has an inside formed with a plurality of fixing holes 91 extended along a peripheral face of the third mounting seat 90, and each of the two side bars 77 of each of the second support members 70 has a bent second end formed with an insert 771 inserted into a respective one of the fixing holes 91 of the third mounting seat 90 so that each of the second support members 70 is fixed between the second mounting seat 50 and the third mounting seat 90.

Accordingly, the musical instrument has an upper portion hung on the respective first support member 60 and a lower portion supported by the respective second support member 70, so that the musical instrument is supported rigidly and stably without oscillation. In addition, the musical instrument stand comprises a plurality of first support members 60 and a plurality of second support members 70 for supporting a plurality of musical instruments without having to provide multiple musical instrument stands to support different musical instruments, thereby decreasing the purchase costs, and thereby saving the space of storage. Further, the second support members 70 have multiple kinds of forms so as to support the musical instruments in different manners, thereby enhancing the outer appearance of the musical instruments, and thereby saving space of exhibition.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A musical instrument stand, comprising:

a base;

a rod mounted on and extended upward from the base;

a first mounting seat mounted on the rod;

a second mounting seat mounted on the rod and located between the base and the first mounting seat;

a plurality of first support members each detachably mounted on the first mounting seat;

a plurality of second support members each detachably mounted on the second mounting seat;

wherein the first mounting seat includes a first upper disk, a first lower disk combined with the first upper disk, and a plurality of first mounting holes each formed between the first upper disk and the first lower disk and each extended along a peripheral face of the first upper disk and the first lower disk, each of the first mounting holes of the first mounting seat has an outer portion formed with a first bore extended through the peripheral face of the first upper disk and the first lower disk and an inner portion formed with a second bore having a diameter greater than that of the first bore, each of the first mounting holes of the first mounting seat is formed with a resting shoulder located between the first bore and the second bore, each of the first mounting holes of the first mounting seat has a side formed with a limit channel connected to the first bore and the second bore.

2. The musical instrument stand in accordance with claim 1, wherein the first mounting seat further includes a substantially L-shaped extension bar extended from the first upper disk and the first lower disk, the extension bar has a distal end formed with a bent clamping portion and has an inside formed with a locking hole, and the extension bar is mounted on and extended from the first lower disk and is located adjacent to either one of the first mounting holes.

3. The musical instrument stand in accordance with claim 2, wherein each of the first support members includes a first mounting rod mounted in the respective first mounting hole of the first mounting seat, a substantially U-shaped support bar mounted on a distal end of the first mounting rod and protruding outward from the respective first mounting hole of the first mounting seat, and a locking stub mounted on the first mounting rod and detachably locked in the locking hole of the extension bar.

4. The musical instrument stand in accordance with claim 3, wherein the locking stub of each of the first support members is located adjacent to the support bar and is clamped by the clamping portion of the extension bar, and the locking hole of the extension bar has an opened end having a width smaller than a diameter of the locking stub of each of the first support members and a closed end having a width greater than the diameter of the locking stub of each of the first support members so that the locking stub of each of the first support members is locked in the locking hole of the extension bar.

5. The musical instrument stand in accordance with claim 1, wherein each of the first support members includes a first mounting rod mounted in the respective first mounting hole of the first mounting seat, a substantially U-shaped support bar mounted on a first end of the first mounting rod and protruding outward from the respective first mounting hole of the first mounting seat, and a first limit stub mounted on a second end of the first mounting rod and extended through the limit channel into the second bore of the respective first mounting hole.

6. The musical instrument stand in accordance with claim 5, wherein each of the first support members further includes a protective bar having a first end pivotally mounted on a first end of the support bar and a second end snapped onto a second end of the support bar so that the protective bar and the support bar form a closure space.

7. The musical instrument stand in accordance with claim 5, wherein the first limit stub of each of the first support members is rested on the resting shoulder of the respective first mounting hole so that each of the first support members is secured to the first mounting seat.

8. The musical instrument stand in accordance with claim 1, wherein the second mounting seat includes a second upper disk, a second lower disk combined with the second upper disk, a plurality of second mounting holes each formed between the second upper disk and the second lower disk and each extended along a peripheral face of the second upper disk and the second lower disk.

9. The musical instrument stand in accordance with claim 8, wherein each of the second mounting holes of the second mounting seat has an outer portion formed with a first bore extended through the peripheral face of the second upper disk and the second lower disk and an inner portion formed with a second bore having a diameter greater than that of the first bore, each of the second mounting holes of the second mounting seat is formed with a resting shoulder located between the first bore and the second bore, each of the second mounting holes of the second mounting seat has a side formed with a limit channel connected to the first bore and the second bore.

10. The musical instrument stand in accordance with claim 9, wherein each of the second support members includes a second mounting rod mounted in the respective second mounting hole of the second mounting seat, a substantially U-shaped support bar mounted on a first end of the second mounting rod and protruding outward from the respective second mounting hole of the second mounting seat, and a second limit stub mounted on a second end of the second mounting rod and extended through the limit channel into the second bore of the respective second mounting hole, the second limit stub of each of the second support members is rested on the resting shoulder of the respective second mounting hole so that each of the second support members is secured to the second mounting seat.

11. The musical instrument stand in accordance with claim 8, wherein each of the second support members is detachably mounted on a respective one of the second mounting holes of the second mounting seat and is corresponding to a respective one of the first support members.

12. The musical instrument stand in accordance with claim 8, wherein each of the second support members includes a second mounting rod mounted in the respective second mounting hole of the second mounting seat, a substantially T-shaped support bar mounted on a distal end of the second mounting rod and protruding outward from the respective second mounting hole of the second mounting seat.

13. The musical instrument stand in accordance with claim 8, wherein each of the second support members includes a second mounting rod mounted in the respective second mounting hole of the second mounting seat, a transverse bar mounted on a distal end of the second mounting rod and protruding outward from the respective second mounting hole of the second mounting seat, and two side bars each having an oblique first end extended upward from the transverse bar and a bent second end rested on the rod, and the second ends of the two side bars of each of the second support members form a clamping opening for clamping the rod.

14. The musical instrument stand in accordance with claim 13, further comprising a third mounting seat mounted on the rod and located between the first mounting seat and the second mounting seat.

15. The musical instrument stand in accordance with claim 14, wherein the third mounting seat has an inside formed with a plurality of fixing holes extended along a peripheral face of the third mounting seat, and each of the two side bars of each of the second support members has a bent second end formed with an insert inserted into a respective one of the fixing holes of the third mounting seat so that each of the second support members is fixed between the second mounting seat and the third mounting seat.

16. The musical instrument stand in accordance with claim 1, further comprising a connecting sleeve mounted on the rod and located between the base and the second mounting seat, wherein the base includes a fixing sleeve mounted on the rod, and the connecting sleeve includes a positioning block mounted on the rod and having a first end mounted on the fixing sleeve of the base and a second end inserted into the second mounting seat, and a pressing member extended through the positioning block and pressed on the fixing sleeve of the base so that the connecting sleeve is fixed on the base.

17. The musical instrument stand in accordance with claim 16, wherein the second mounting seat further includes an outer sleeve mounted on the positioning block of the connecting sleeve, and a positioning member extended through the outer sleeve and pressed on the positioning block of the connecting sleeve so that the second mounting seat is fixed on the connecting sleeve.

18. The musical instrument stand in accordance with claim 17, wherein the outer sleeve of the second mounting seat has an inside formed with a positioning recess mounted on the positioning block of the connecting sleeve.

19. The musical instrument stand in accordance with claim 1, wherein the base includes a fixing sleeve mounted on the rod, and three support legs each mounted between the fixing sleeve and the rod and each expanded outward from the rod.

* * * * *